July 9, 1940.     S. MacD. PARKER     2,207,491
FLUID PRESSURE REMOTE CONTROL SYSTEM
Filed Nov. 17, 1938     3 Sheets-Sheet 2

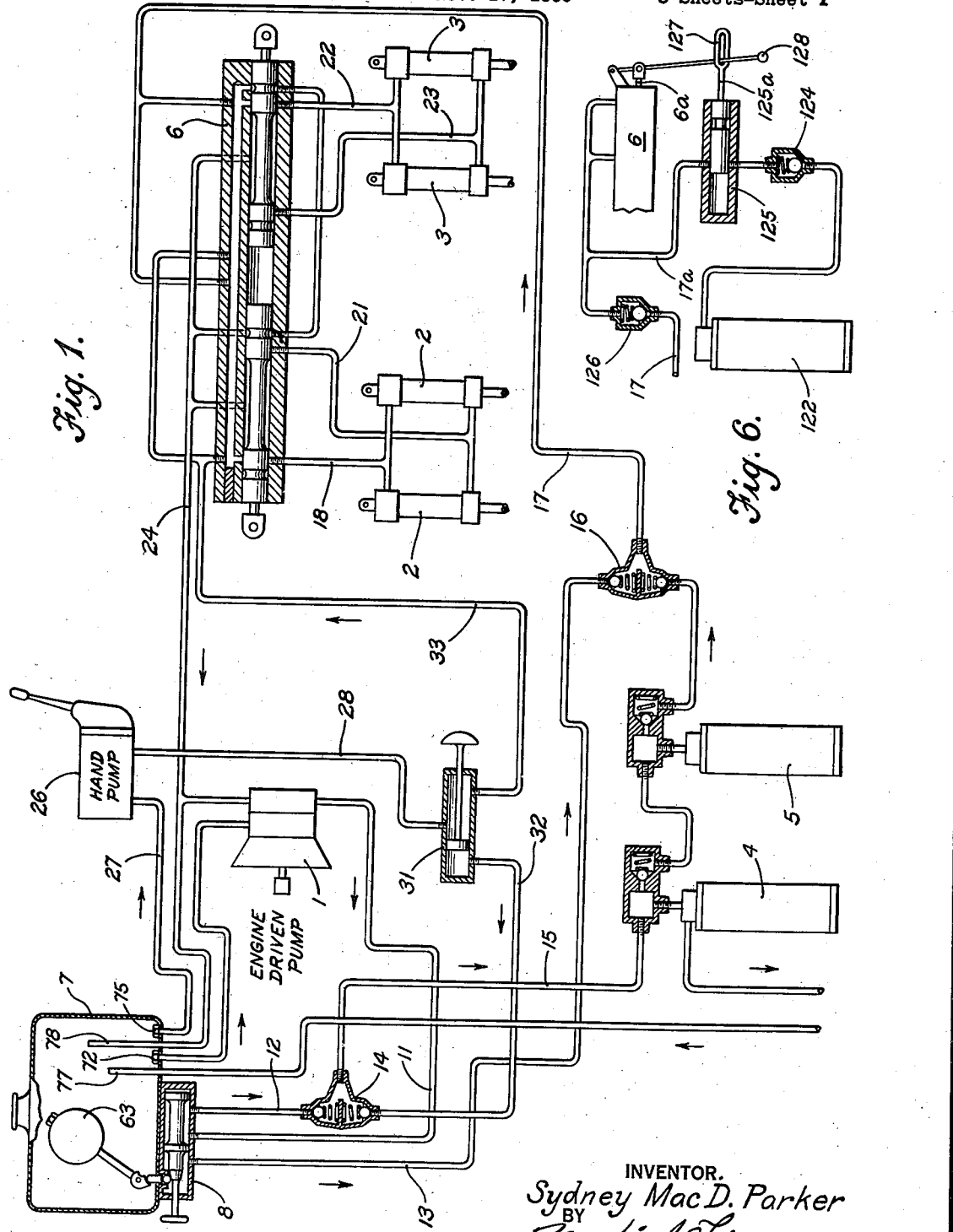
July 9, 1940.     S. MacD. PARKER     2,207,491
FLUID PRESSURE REMOTE CONTROL SYSTEM
Filed Nov. 17, 1939     3 Sheets-Sheet 1
INVENTOR.
Sydney MacD. Parker
BY Martin J. Finnegan
ATTORNEY.

INVENTOR.
S. M. Parker
By Martin J. Finnegan
Attorney

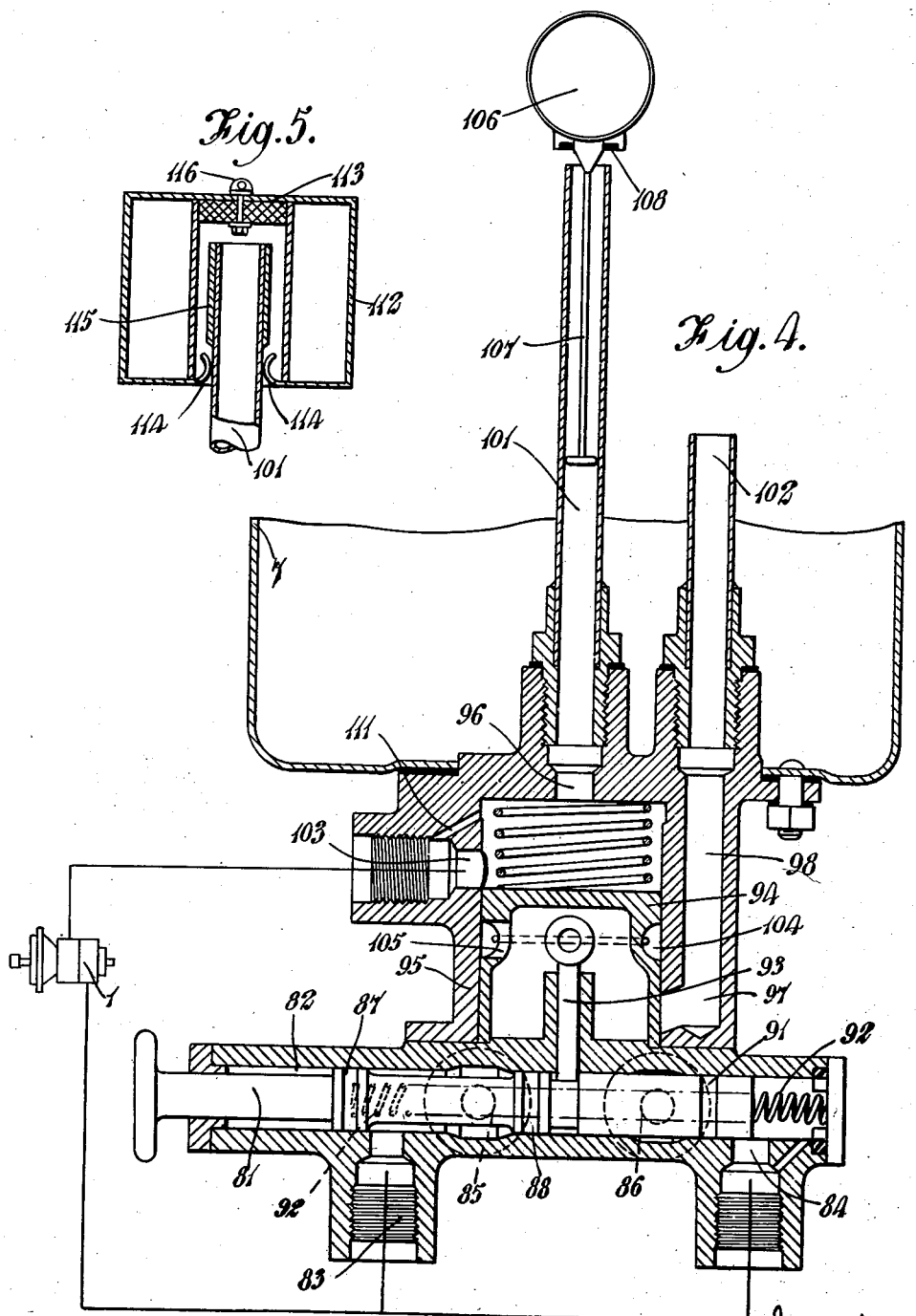

Patented July 9, 1940

2,207,491

UNITED STATES PATENT OFFICE 2,207,491

FLUID PRESSURE REMOTE CONTROL SYSTEM

Sydney Macdonald Parker, Myton, Warwick, England, assignor to Automotive Products Company Limited, London, England, a company of Great Britain Application November 17, 1938, Serial No. 241,063
In Great Britain November 25, 1937

7 Claims. (Cl. 303—6)

This invention relates to fluid pressure remote control systems in which the pressure generated by a single pump or group of pumps is employed selectively to operate a plurality of fluid pressure responsive motors performing various services, as for example, on an aircraft where there are numerous devices which are readily adapted for fluid pressure control, such as the retractable undercarriage, flaps, brakes, bomb doors and hoists, gun triggers and others.

One object of the invention is to provide a fluid pressure remote control system for performing a plurality of services, in which certain services of primary importance are so connected to the source of pressure fluid that damage to the portions of the system controlling the remaining services cannot bring the system into a condition in which such primary services are put out of action.

Another object of the invention is to provide a fluid pressure remote control system for performing one or more primary services and one or more secondary services which comprises a pump delivering pressure fluid to fluid pressure responsive motors or pressure accumulators operating the main services, and also to pressure accumulators operating the secondary services, and a valve device operated by loss of fluid from the system to isolate from the pump the pressure accumulators supplying the secondary services.

Still another object of the invention is to provide a fluid pressure remote control system comprising one or more pumps delivering pressure fluid to a common circuit, and motors or pressure accumulators receiving said fluid and serving to operate controlled devices, a part of the circuit being divided into two branches, one of which supplies the pressure accumulators serving to operate certain of the controlled devices, a valve device being provided which is operated by loss of fluid from the system to isolate from the circuit the branch supplying said pressure accumulators.

Another object of the invention is to provide a fluid pressure remote control system comprising one or more pumps delivering pressure fluid to a selector valve by which the pressure fluid is directed to any one of a plurality of fluid pressure responsive motors operating controlled devices, the pump or pumps being connected to the selector valve by two separate paths, in one of which are arranged pressure accumulators storing pressure fluid for the operation of other controlled devices, and a valve device operated by loss of fluid from the system being provided to close the path in which the pressure accumulators are arranged.

According to a further feature of the invention, the valve device adapted to close one of the paths connecting the source of pressure fluid to the motors is operated by the fall of the fluid level in a reservoir supplying the system, and is controlled by a float in the reservoir, the valve device comprising for example a spring loaded plunger retained in one position by a detent, and the movement of the float as the liquid level falls causing the withdrawal of the detent, whereby the plunger is released for movement under the influence of the spring.

Other objects and features of the invention will be apparent from the following description taken in connection with the drawings forming a part of this specification, and in which:

Figure 1 is a diagrammatical view of a fluid pressure remote control system, embodying the invention;

Figure 4 is a sectional elevation of an alternative arrangement of the reservoir and change-over valve device;

Figure 5 shows a modified form of float for use in the arrangement shown in Figure 4; and Figure 6 is a diagrammatical view of a modified fluid pressure remote control system embodying the invention.

Figure 1 shows diagrammatically a system in which a single engine driven pump 1 supplies liquid under pressure to fluid pressure responsive motors operating any one of four services.

Figure 3:
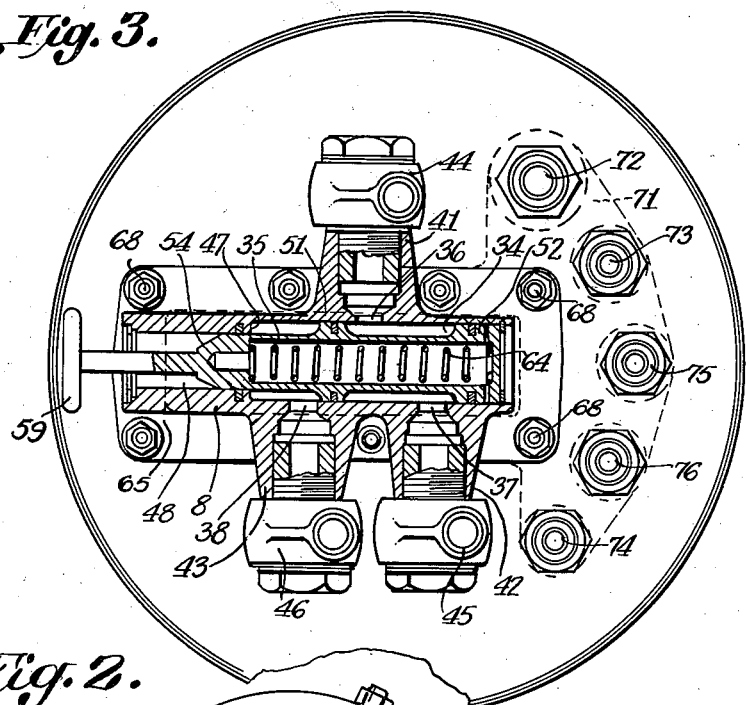
Figure 3 is a sectional plan view on the line III—III of Figure 2.

The system is designed for use in an aircraft, and is employed for operating a retractable undercarriage, flaps, brakes and guns. The undercarriage is operated by jacks represented at 2, 2, the flaps by jacks represented at 3, 3, and the brakes and guns are operated by motors not shown, receiving liquid respectively from the accumulators represented at 4 and 5.

The admission of liquid to the undercarriage and flap jacks is controlled by a selector valve 6 having separate selecting plungers for the undercarriage and flaps, each of which plungers may be moved in two directions from a neutral position to supply liquid for extending or contracting the jacks. The liquid from the accumulators 4 and 5 is admitted to the motors operating the brakes and guns by separate control valves (not shown). Thus the undercarriage and flap operations are the "primary" services, and the brake and gun operations the "secondary" services.

A reservoir 7 contains a reserve supply of liquid, and to the base of this reservoir is secured a valve device 8 to which liquid is delivered from the pump 1 through a pipe 11. From the valve device 8 lead two pipes 12 and 13, the pipe 12 leading to a non-return valve unit 14, from which a pipe 15 leads to the pressure accumulators 4 and 5 and to a second non-return valve unit 16. The pipe 13 from the valve device 8 also leads to the non-return valve unit 16, and a third pipe 17 from that unit leads to the selector valve 6, and unit 16 comprising two non-return valves so arranged that liquid can flow only from pipe 12 or 15 to pipe 17, and cannot flow back into either pipe 12 or pipe 15.

Each of the accumulators 4 and 5 is provided with a cut-off and by-pass valve, by means of which the liquid flowing in the pipe 15 is diverted into the accumulator when the pressure therein falls below a predetermined limit, the valve operating automatically when the accumulator is re-charged to by-pass the liquid, so that it flows on by the pipe 17 to the selector valve. This valve may be of any desired type, an example being that described in the United States Application Serial No. 159,803, filed on August 18th, 1937 (now Patent No. 2,184,793).

From the selector valve 6 lead pipes 18, 21, 22, 23, the pipes 18, 21 leading to opposite ends of the undercarriage jacks 2, 2, and the pipes 22, 23 to opposite ends of the flap jacks 3, 3. The selector valve is so arranged that any one of these pipes may be connected to the pipe 17 so that liquid under pressure is supplied to one end of the jacks of one or other set, the pipe leading to the other ends of these jacks being connected simultaneously to a pipe 24 leading from the selector valve to the reservoir and so permitting the liquid expelled from the jacks to return to the reservoir. When the selector valve plungers are in their neutral positions, the pipes 17 and 24 are connected, so that the liquid delivered by the pump can circulate idly. None of these features of the valve 6 are claimed herein, per se; for such claims reference should be had to my Patent No. 2,184,793, above referred to.

A hand pump 26 is provided for loading the accumulators when the engine driven pump 1 is not working, and also for operating the flap jacks 3 or undercarriage jacks 2 under the same conditions. This hand pump draws liquid from the reservoir 7 through a pipe 27, and delivers it by a pipe 28 to a hand operated valve 31 having two positions. From the valve 31 a pipe 32 leads to the non-return valve unit 14, and a second pipe 33 leads to the selector valve 6. Thus by suitably positioning the valve 31, the liquid delivered by the hand pump may be supplied through pipes 32 and 15 to the accumulators, or through the pipe 33 to the selector valve.

It will be observed that there are two paths by which liquid may flow from the change-over valve device 8 to the selector valve 6. One path is through pipe 12, valve unit 14, pipe 15, valve unit 16 and pipe 17, the liquid then flowing through the cut-out valves of the accumulators, and re-charging these if necessary. The other path is through pipe 13, direct to valve unit 16 and through pipe 17. The valve device 8 is so arranged that the delivery pipe 11 of the pump may be connected to either pipe 12 or 13, being normally connected to the pipe 12, and the valve device 8 is operated in a manner to be hereinafter described, in the event of leakage in the system, to disconnect the pipe 11 from the pipe 12, and connect the former to the pipe 13.

The pump 1, therefore, delivers liquid under normal conditions to the pipe 12, from which it flows to the pipe 15, and loads up the accumulators 4, 5, flowing on when these are fully loaded, through the pipe 17, selector valve 6 and pipe 24 back to the reservoir 7. Should it be desired to operate the undercarriage or flaps, for example, to lower the undercarriage, the selector valve 6 is operated to connect the pipe 17 to the pipe 18, the pipe 21 being simultaneously connected by the pipe 24 to the reservoir, and the liquid delivered by the pump extends the jacks 2, 2, liquid from the other ends of the jacks returning freely to the reservoir. The selector valve may be arranged to return automatically to its neutral position when the lowering of the undercarriage is completed.

Should there be continuous leakage of liquid from the system, the change-over valve device 8 is operated to disconnect the pipe 11 from the pipe 12, and to connect it to the pipe 13, thus cutting the accumulators 4 and 5 out of the circuit, and causing the pump to deliver liquid directly to the selector valve, so that if the leakage is in the accumulators, or in the cylinders and pipe of the services operated by the accumulators, which together form a large and somewhat vulnerable part of the system, the services supplied through the selector valve are able to continue working.

Figure 2:
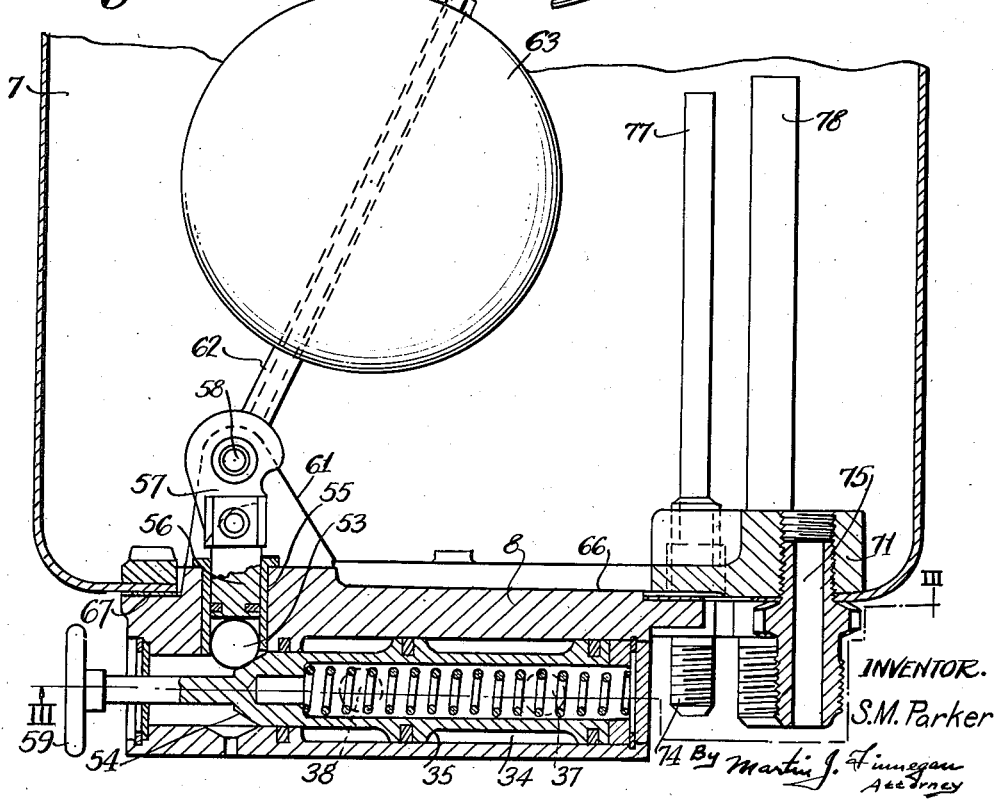
Figure 2 is a sectional elevation of a reservoir and change-over valve device for the system shown in Figure 1.

One form of change-over valve device for use in this system is shown in Figures 2 and 3, the valve body being mounted on the base of the reservoir 7 as indicated in Figure 1.

The valve device 8 is formed with a cylindrical bore 34 in which is fitted a valve plunger 35, and ports 36, 37, 38 in the walls of the bore 34 lead to passages in lateral bosses 41, 42, 43, drilled and tapped to receive banjo connections 44, 45, 46, to which the pipes 11, 12 and 13 are connected. The bore 34 is stepped at 47 to provide an end portion 48 of reduced diameter. The valve plunger 35 has a main diameter which is a sliding fit in the part 48 of the main bore, and from which project collars 51, 52 fitting in the main bore 34, these collars defining an annular space between them. The ports 37 and 38, leading respectively to the pipes 12 and 13, are on one side of the bore 34, and are spaced apart, the port 36 leading to the pipe 11 being on the other side of the bore 34, and approximately midway between the other two ports, so that either port 37 or 38 may be connected by the annular space between the collars 51, 52 to the port 36, the other port being cut off. The plunger is shown in the position in which it connects the ports 36 and 37, that is the position for normal operation of the system, and it is retained in this position by a ball 53 engaging a conical part 54 of the plunger, the ball 53 being mounted in an aperture 55 in the side of the part 48 of the bore 34, and being held in position by a plunger 56 in turn engaged by a cam 57. The cam 57 is pivotally mounted at 58 between two lugs 61 provided in the valve device 8 and projecting into the reservoir 7, the pivot 58 also carrying an arm 62 on which is mounted a float 63. A spring 64 mounted in the hollow interior of the valve plunger 35 tends to move the plunger from the position in which it is held by the ball 53, and as soon as the liquid level in the reservoir becomes too low to support the float 63, the latter falls, turning the cam 57 and releasing the plunger 56, so that the valve plunger 35, under the influence of the spring 64, forces the ball 53 aside and moves along the bore 34, cutting off the port 36 from the port 37, and bringing into communication the ports 36 and 38. The accumulators 4, 5 are then cut off from the pump, as described with reference to Figure 1, and the pump delivers directly to the selector valve. The valve may be re-set to its initial position when the reservoir is refilled and the system repaired, by pushing it inwardly against the spring 64 until the ball 53 again rides down the conical surface 54 and the cam 57 holds it in position. A handle 59 is provided on the plunger 35 to assist the resetting operation.

The valve device 8 is formed with a flange 65 by means of which it is bolted to the base of the reservoir 7, the latter being cutaway as shown in Figure 2 to permit a projecting part 66 of the valve device to project through into the reservoir, and a gasket 67 being fitted to render the joint liquid-tight. The bolts 68 securing the valve device 8 in place also secure a plate 71 to the inner face of the reservoir bottom, this plate 71 serving as a mounting for the several pipe unions for the supply and return pipes.

These unions are five in number (see Figure 3), union 72 being for the pump suction pipe, unions 73 and 74 for the return or exhaust pipes from the units fed by the accumulators 4 and 5, union 75 for the suction pipe 27 of the hand pump, and union 76 for the return pipe 24 from the selector valve. The union 73, 74 and 76 of the return pipes are provided with stand-pipes in the reservoir 7 which extend above the level of liquid at which the float 63 operates the change-over valve device 8, so that the liquid remaining in the reservoir after the valve has changed over cannot be lost by leakage through the return pipes. The stand pipes 77, 78 rising from unions 74 and 76 are shown in Figure 2, as is also the union 75, which has no stand-pipe.

An alternative form of change-over valve device is shown in Figure 4, this form of valve device also being arranged on the base of the reservoir 7. This form of change-over valve device comprises a plunger 81 working in a bore 82, into which open two ports 83, 84 connected to the pump delivery, and two ports 85, 86 leading respectively to the pipes 12 and 13 of Figure 1. The plunger carries three seals, shown in the drawing as rubber rings 87, 88, 91, so arranged that in one of two selected positions the port 83 is connected to the port 85, and in the other the port 84 is connected to the port 86, the other pump port being sealed in each case. The valve plunger 81 is hollow, and inside it is mounted a spring 92 urging it towards the position in which the pump delivery port 84 is connected to the pipe port 86, a detent 93 being provided to hold the plunger against the spring, in a position in which the ports 83 and 85 are in connection with each other. This detent 93 is carried by a piston 94 moving in a cylinder 95 bolted to the base of the reservoir 7, the piston moving in a direction at right angles to the valve plunger 81. In the upper end of the cylinder 95 is a port 96 leading to the interior of the reservoir 7, and in the cylinder wall close to the lower end is a port 97 leading to a passage 98 also opening into the reservoir. Stand-pipes 101, 102 of different lengths are connected to the port 96 and the passage 98, the longer stand pipe 101 being connected to the port 96. A port 103 in the wall of the cylinder 95 leads to the suction orifice of the pump 1, and this port is placed in communication with either stand-pipe 101 or 102, according to the position of the piston 94, the port 103 being above the piston when the latter is in its lower position, and so being connected to the stand-pipe 101. The port 103 is in register with a groove 104 in the piston when the latter is in its upper position, said groove being connected by a port 105 to the lower side of the piston, so that the port 103 is then connected to the stand-pipe 102.

A float 106 in the reservoir carries a dependent stem 107 which enters the stand-pipe 101, the float having on its lower surface a seating washer 108 which rests on the upper end of the stand-pipe and closes it when the liquid level in the reservoir falls to a sufficient extent.

So long as the liquid in the reservoir 7 is above the top of the stand-pipe 101, the float 106 leaves the end of the stand-pipe open, and the piston 94 remains at the lower end of the cylinder 95, sealing the port 97. The pump suction port 103 is then in communication with the stand-pipe 101, and the detent 93 holds the plunger 81 in the position in which the ports 83 and 85 are connected, so that the liquid delivered by the pump flows through the pipe 15 (Figure 1) and keeps the accumulators charged.

If, due to leakage of liquid, the level in the reservoir 7 falls, the float 106 eventually reaches a position in which the seating washer 108 closes the top of the stand-pipe 101. The continued operation of the pump creates a vacuum in the cylinder 95 above the piston 94, with the result that the piston is drawn along the cylinder until it exposes the port 97, and at the same time withdraws the detent 93 to release the plunger 81, which is moved by the spring 92 to close off the pump delivery port 83, and to connect the ports 84 and 86. The liquid from the pump then flows to the selector valve without passing through the pipe 15. A by-pass port 111 is provided between the extreme top of the cylinder 95 and the port 103, so that the suction is able to lift the piston 94 until the groove 104 registers with the port 103, and liquid can flow to the pump through the lower stand-pipe 102, the passage 98, cylinder 95, groove 104 and port 103, thus keeping up the supply from the liquid remaining in the reservoir.

Figure 5 shows a modified form of float which may be used instead of that shown in Figure 4. This float comprises a hollow annular body 112 the central passage through which is closed at its upper end and carries at seating 113 of soft material such as india rubber. The lower end is provided with a plurality of inwardly projecting spring fingers 114, and the stand-pipe 101 has a collar 115 brazed or sweated on to its upper end, the spring fingers 114 being arranged to engage beneath the collar 115 and prevent the float from leaving the stand-pipe. An eyelet 116 is mounted in the top of the float for the attachment of a chain or wire which enables the float to be pulled off the stand-pipe when its removal is required for cleaning or inspection.

Each of the accumulators 4 and 5 is connected to the motors of the services which it operates, through a control valve having two positions, in one of which the pressure accumulator is connected to the motors, whilst in the other position the motor is connected to an exhaust passage (117 or 118 in Figure 1) leading to the reservoir 7. These control valves and the motors of the accumulator-operated services are not shown on the drawings.

It will be understood that any number of primary services and any number of secondary services may be operated by the system according to this invention, the primary services being operated directly by the pump through a selector valve, or by accumulators in the same manner as the secondary services. It may even be found desirable to operate some device, such as a retractable undercarriage, either by an accumulator, as a "secondary service," or directly by the pump as a "primary service," the accumulator normally serving to operate the undercarriage, whilst the direct operation is available in an emergency.

Figure 6 shows schematically the manner in which an auxiliary pressure accumulator may be added to the system of Figure 1 for the purpose of assisting in at least the lowering operation of the undercarriage.

Such an additional accumulator, as indicated at 122 in Figure 6, may have connection with pipe 17 (corresponding to pipe 17 of Figure 1) by way of a connecting conduit 17a in which is located a non-return valve 124 and a manually controllable valve 125; a similar non-return valve 126 being fitted in pipe 17 to prevent reverse flow in the latter. Numeral 6a in Fig. 6 identifies the plunger corresponding to the left-hand plunger of the valve 6 of Fig. 1, said plunger being the one controlling operation of the undercarriage jacks 2, 2.

The control rod 125a of the valve 125 has a lost motion connection, represented diagrammatically at 127, with the hand lever 128 of the selector valve 6, the arrangement being such that the selector valve may be operated to raise the undercarriage whilst leaving the valve 125 closed, so that the raising operation is carried out by pressure liquid coming directly from the pump 1. When the selector valve is operated to lower the undercarriage, however, the valve 125 is opened, and the pressure in the accumulator 122 is brought into use. Because of the non-return valves 124, 126, pressure from the accumulator 122 can lower the undercarriage even if there is a leak in the pipe 17, and similarly no damage to the accumulator 122 can affect the operation of the undercarriage by pressure liquid flowing directly from the pump 1.

By controlling the valve 125 independently of the selector valve 6, the accumulator pressure may be used at will to assist or replace the direct flow of liquid from the pump, and in such case the accumulator may be used to assist in raising the undercarriage.

The pressure accumulators actuating the secondary services may be arranged in any part of the main pump circuit, the change-over valve device being suitably arranged to isolate that part of the circuit. For example they may be arranged in the return pipe 24 between the selector valve 6 in Figure 1 and the reservoir 7. The main services will then have priority of operation if one is selected whilst one or more of the accumulators is partially discharged, instead of being delayed until all the accumulators are fully charged, as is the case in the systems shown in Figures 1 and 6.

The system is capable of use for other purposes than aircraft controls, being readily adapted for use in any position where a plurality of devices are to be controlled by liquid pressure means.

It will be understood that the fluid pressure remote control system according to this invention is intended to enable additional services to be operated by a single pressure source without increasing the likelihood of failure of a number of main services.

Although this invention has been described in connection with certain specific embodiments, the principles involved are susceptible of numerous other applications that will readily occur to persons skilled in the art. The invention is, therefore, to be limited only by the scope of the appended claims.

What I claim is:

1. A fluid pressure remote control system comprising a source of pressure fluid, fluid pressure responsive motors, separate paths connecting the source of pressure fluid to the motors, a spring loaded plunger controlling said paths, stop means keeping the plunger in a position to connect the source of pressure fluid to one of said paths and means operated by the level of fluid and actuating said stop means to connect the source of pressure fluid to the other of said paths.

2. A fluid pressure remote control system according to claim 1, comprising a float, a cam actuated by the float and detent means operated by the cam and controlling the position of the plunger.

3. A fluid pressure remote control system according to claim 1, comprising a plurality of return flow conduits terminating in said reservoir, a float in the reservoir operating the stop means, and means including a stand-pipe for each of said return flow conduits to prevent loss of fluid from the reservoir by way of any of said return flow conduits, each of said stand-pipes having a height which is above the level at which is operated the float.

4. A fluid pressure remote control system comprising a power pump, fluid pressure responsive motors, a reservoir, separate paths connecting the power pump to the motors, a spring loaded plunger controlling the paths, a connection between the reservoir and the suction port of the pump, a chamber forming part of said connection, a piston in said chamber, a detent on the piston engaging with the plunger for keeping it in a position to connect the pump to one of said paths, a stand-pipe in the reservoir connected to said chamber, a float adapted to shut off said stand-pipe and thus induce a vacuum in the chamber for withdrawing the detent from the plunger, and connect the pump to the other of said paths.

5. A fluid pressure remote control system comprising a power pump, fluid pressure responsive motors, a reservoir, a connection between the reservoir and the suction port of the pump, a chamber forming part of said connection, a piston in said chamber, a stand-pipe in the reservoir connected to the chamber above said piston, a float adapted to shut off said stand-pipe and induce a vacuum in said chamber, a shorter stand-pipe in the reservoir having a connection to the chamber below said piston, and a passage through the piston for connecting the suction port of the pump to said shorter stand-pipe.

6. A fluid pressure remote control system according to claim 3 comprising a valve controlling the delivery of the accumulator, a selector valve adapted to connect the source of pressure fluid to any of the motors, a control member operating the selector valve, an operating connection between the control member and the valve controlling the delivery of the accumulator, and a lost motion in said operating connection.

7. A fluid pressure remote control system comprising a reservoir, a source of pressure fluid, fluid pressure responsive motors, connections between the source of pressure fluid and the motors, a selector valve adapted to connect the source of pressure fluid to any of said motors, separate paths between the source of pressure fluid and the selector valve, accumulator means arranged on one of said paths, a spring loaded plunger controlling said paths, stop means retaining the plunger in a position to connect the source of pressure fluid to said one path and a float in the reservoir actuating said stop means upon the fall of liquid level in the reservoir, to cut off the path in which the accumulator means is arranged and connect the source of pressure fluid to the other path.

SYDNEY MACDONALD PARKER.